(12) United States Patent
Phillips

(10) Patent No.: US 10,449,532 B2
(45) Date of Patent: *Oct. 22, 2019

(54) CATALYSTS AND FUELS FOR PRODUCING HYDROGEN

(71) Applicants: Douglas Howard Phillips, Millerton, OK (US); H2 CATALYST, LLC, New York, NY (US)

(72) Inventor: Douglas Howard Phillips, Millerton, OK (US)

(*) Notice: Subject to any disclaimer, the term of this patent is extended or adjusted under 35 U.S.C. 154(b) by 632 days.

This patent is subject to a terminal disclaimer.

(21) Appl. No.: 14/787,206

(22) PCT Filed: Apr. 24, 2014

(86) PCT No.: PCT/US2014/035362
§ 371 (c)(1),
(2) Date: Oct. 26, 2015

(87) PCT Pub. No.: WO2014/176459
PCT Pub. Date: Oct. 30, 2014

(65) Prior Publication Data
US 2016/0068971 A1    Mar. 10, 2016

Related U.S. Application Data

(60) Provisional application No. 61/816,062, filed on Apr. 25, 2013.

(51) Int. Cl.
*B01J 37/34*       (2006.01)
*C01B 3/08*        (2006.01)
(Continued)

(52) U.S. Cl.
CPC ............ *B01J 37/348* (2013.01); *B01J 21/18* (2013.01); *B01J 23/14* (2013.01); *B01J 35/0033* (2013.01);
(Continued)

(58) Field of Classification Search
CPC .... B01J 37/348; B01J 21/18–20; B01J 23/14; C01B 3/08; C01B 3/06
See application file for complete search history.

(56) References Cited

U.S. PATENT DOCUMENTS 4,251,566 A    2/1981    Gingerich
4,304,643 A    12/1981   Divisek et al.
(Continued)

FOREIGN PATENT DOCUMENTS

JP       55088849 A   *   7/1980   ............ B01J 37/348
WO       2013016367 A1      1/2013

OTHER PUBLICATIONS

Darwent (1970) Bond Dissociation Energies in Simple Molecules, NSRDS-NBS31, pp. 1-48.

*Primary Examiner* — Nicholas A Smith
(74) *Attorney, Agent, or Firm* — Tarter Krinsky & Drogin LLP

(57) ABSTRACT

Exemplary embodiments of methods and systems for hydrogen production using an electro-activated material (catalyst) are provided. The catalysts can be chosen from various elements that have characteristics that fall within a particular range. In some exemplary embodiments, a material can be electro-activated and used as a catalyst in a chemical reaction with a fuel such as water or another hydrogen containing molecule. Another fuel can also be added, such as aluminum, to generate hydrogen. Controlling the temperature of the reaction, the amount of the catalyst and/or the amounts of aluminum can provide hydrogen on demand at a desired rate of hydrogen generation.

23 Claims, 5 Drawing Sheets

(51) Int. Cl.
*B01J 21/18* (2006.01)
*B01J 23/14* (2006.01)
*B01J 35/00* (2006.01)
*C25B 1/04* (2006.01)
*C25B 9/06* (2006.01)
*C25B 15/02* (2006.01)

(52) U.S. Cl.
CPC ............... *C01B 3/08* (2013.01); *C25B 1/04* (2013.01); *C25B 9/06* (2013.01); *C25B 15/02* (2013.01); *Y02E 60/366* (2013.01)

(56) References Cited

U.S. PATENT DOCUMENTS

| | | | |
|---|---|---|---|
| 4,309,315 A * | 1/1982 | Nakamura | B01J 37/348 |
| | | | 204/192.15 |
| 6,200,457 B1 * | 3/2001 | Durand | C25B 11/0489 |
| | | | 204/280 |
| 6,258,476 B1 * | 7/2001 | Cipollini | H01M 4/86 |
| | | | 429/413 |
| 7,771,612 B2 * | 8/2010 | Sugita | C01B 3/08 |
| | | | 252/181.2 |
| 9,102,529 B2 * | 8/2015 | Phillips | H01M 8/065 |
| 2002/0048548 A1 | 4/2002 | Chaklader | |
| 2009/0050258 A1 * | 2/2009 | Popov | B32B 37/24 |
| | | | 156/150 |
| 2010/0173225 A1 * | 7/2010 | Rosenband | C01B 3/08 |
| | | | 429/502 |

* cited by examiner

Figure 2

| Element | Symbol | Element # | Electronegativity | Electronegativity difference | | Absolute magnitude of electronegativity difference |
|---|---|---|---|---|---|---|
| Niobium | Nb | 41 | 1.6 | -0.60 | Nb | 0.60 |
| Aluminum | Al | 13 | 1.61 | -0.59 | Al | 0.59 |
| Vanadium | V | 23 | 1.63 | -0.57 | V | 0.57 |
| Zinc | Zn | 30 | 1.65 | -0.55 | Zn | 0.55 |
| Chromium | Cr | 24 | 1.66 | -0.54 | Cr | 0.54 |
| Cadmium | Cd | 48 | 1.69 | -0.51 | Cd | 0.51 |
| Indium | In | 49 | 1.78 | -0.42 | In | 0.42 |
| Gallium | Ga | 31 | 1.81 | -0.39 | Ga | 0.39 |
| Iron | Fe | 26 | 1.83 | -0.37 | Fe | 0.37 |
| Cobalt | Co | 27 | 1.88 | -0.32 | Co | 0.32 |
| Silicon | Si | 14 | 1.9 | -0.30 | Si | 0.30 |
| Rhenium | Re | 75 | 1.9 | -0.30 | Re | 0.30 |
| Technetium | Tc | 43 | 1.9 | -0.30 | Tc | 0.30 |
| Copper | Cu | 29 | 1.9 | -0.30 | Cu | 0.30 |
| Nickel | Ni | 28 | 1.91 | -0.29 | Ni | 0.29 |
| Silver | Ag | 47 | 1.93 | -0.27 | Ag | 0.27 |
| Tin | Sn | 50 | 1.96 | -0.24 | Sn | 0.24 |
| Polonium | Po | 84 | 2 | -0.20 | Po | 0.20 |
| Mercury | Hg | 80 | 2 | -0.20 | Hg | 0.20 |
| Germanium | Ge | 32 | 2.01 | -0.19 | Ge | 0.19 |
| Bismuth | Bi | 83 | 2.02 | -0.18 | Bi | 0.18 |
| Thallium | Tl | 81 | 2.04 | -0.16 | Tl | 0.16 |
| Boron | B | 5 | 2.04 | -0.16 | B | 0.16 |
| Antimony | Sb | 51 | 2.05 | -0.15 | Sb | 0.15 |
| Tellurium | Te | 52 | 2.1 | -0.10 | Te | 0.10 |
| Molybdenum | Mo | 42 | 2.16 | -0.04 | Mo | 0.04 |
| Arsenic | As | 33 | 2.18 | -0.02 | As | 0.02 |
| Phosphorus | P | 15 | 2.19 | -0.01 | P | 0.01 |
| Hydrogen | H | 1 | 2.2 | 0.00 | H | 0.00 |
| Iridium | Ir | 77 | 2.2 | 0.00 | Ir | 0.00 |
| Ruthenium | Ru | 44 | 2.2 | 0.00 | Ru | 0.00 |
| Osmium | Os | 76 | 2.2 | 0.00 | Os | 0.00 |
| Astatine | At | 85 | 2.2 | 0.00 | At | 0.00 |
| Palladium | Pd | 46 | 2.2 | 0.00 | Pd | 0.00 |
| Platinum | Pt | 78 | 2.28 | 0.08 | Pt | 0.08 |
| Rhodium | Rh | 45 | 2.28 | 0.08 | Rh | 0.08 |
| Lead | Pb | 82 | 2.33 | 0.13 | Pb | 0.13 |
| Tungsten | W | 74 | 2.36 | 0.16 | W | 0.16 |
| Gold | Au | 79 | 2.54 | 0.34 | Au | 0.34 |
| Carbon | C | 6 | 2.55 | 0.35 | C | 0.35 |
| Selenium | Se | 34 | 2.55 | 0.35 | Se | 0.35 |
| Sulfur | S | 16 | 2.58 | 0.38 | S | 0.38 |
| Iodine | I | 53 | 2.66 | 0.46 | I | 0.46 |

Possible Candidates

| Electronegativity Difference | Type of Bond Formed |
|---|---|
| 0.0 to 0.2 | nonpolar covalent |
| 0.3 to 1.4 | polar covalent |
| > 1.5 | ionic |

CATALYSTS AND FUELS FOR PRODUCING HYDROGEN

CROSS-REFERENCE TO RELATED APPLICATIONS

This application relates to and claims priority from U.S. Provisional Patent Application Ser. No. 61/816,062 filed Apr. 25, 2013, the entire disclosures of which are hereby incorporated herein by reference.

FIELD OF THE DISCLOSURE

The present disclosure relates to exemplary embodiments of catalysts and fuels for producing hydrogen, and more particularly, to exemplary embodiments of methods and systems for producing hydrogen from chemical reactions involving various catalysts and fuels.

BACKGROUND INFORMATION

Hydrogen can be considered to be a promising energy alternative to carbon-based fuels. Various technologies have been developed regarding the production and use of hydrogen as a fuel or energy source. While hydrogen may be considered to be a clean and desirable energy alternative to carbon-based fuels, various obstacles may exist in relying on hydrogen as an energy source as opposed to other forms of energy. Such obstacles may generally include the ability to efficiently, safely and economically produce, transport and store hydrogen.

One approach to producing hydrogen can include thermochemical processes. One such process can include carrying out chemical reactions between a sulfur-iodine compound and water at high temperatures (e.g., above approximately 800 degrees C.). Generally, the process can result in the splitting of the water molecules ($H_2O$) into hydrogen ($H_2$) and oxygen ($O_2$). The sulfur-iodine solution can be recycled in the process and therefore, other than hydrogen and oxygen, there may be no harmful byproducts.

Another approach to producing hydrogen can include the electrolysis of water. Electrolysis requires the use of electricity, in accordance with Faraday's Law. Electrolysis can be a relatively inefficient process for producing hydrogen without the aid of another energy source (beyond the supply of electricity). Indeed, the energy consumed may be more valuable than the hydrogen produced. In order to make electrolysis an economically viable process, another energy source can be incorporated into the process. For example, high-temperature electrolysis utilizes a high-temperature heat source to heat the water and effectively reduce the amount of electrical energy required to split the water molecules into hydrogen and oxygen with higher efficiencies. Another approach can involve the extraction of hydrogen from fossil fuels, such as natural gas or methanol. This method can be complex and result in residues, such as carbon dioxide. Also, there is a worldwide limit to the amount of fossil fuel available for use in the future.

Other approaches are needed to address hydrogen production, such that the hydrogen production may be carried out in an effective, efficient and safe manner. A hydrogen-based economy can be a long-term, environmentally-benign energy alternative for sustainable growth. An increasing demand for hydrogen may arise as the worldwide need for more electricity increases, greenhouse gas emission controls tighten, and fossil fuel reserves wane.

SUMMARY OF EXEMPLARY EMBODIMENTS OF THE DISCLOSURE

At least some of the above described problems can be addressed by exemplary embodiments of the methods and systems according to the present disclosure. The present disclosure describes exemplary embodiments of methods and systems that can produce hydrogen on demand (HOD) using various catalysts and fuels.

According to one exemplary embodiment of the present disclosure, a method of producing a catalyst for hydrogen production is provided, comprising providing a material having an absolute magnitude of a difference in electronegativities between the material and hydrogen of between approximately 0.08 to approximately 0.36, and providing electrical energy to the material to electro-activate the material, using the electro-activated material to produce hydrogen. The material can be provided in a liquid composition comprising water.

The method can further comprise determining whether the material has a catalyst hydride dissociation energy between approximately 0 to approximately 100 kcal/mol. The method can further comprise determining whether the material has a difference in electronegativities between atoms in a polar oxide molecule on a surface of the material between approximately 0.3 to approximately 1.4. The material can be carbon or lead.

According to another exemplary embodiment of the present disclosure, a method of producing hydrogen is provided, comprising determining whether a material has an absolute magnitude of a difference in electronegativities between the material and hydrogen of between approximately 0.08 to approximately 0.36, electro-activating the material if the material has the absolute magnitude of a difference in electronegativities between the material and hydrogen of between approximately 0.08 to approximately 0.36, combining an electro-activated material with a hydrogen containing molecule, and generating a chemical reaction between the combination of electro-activated material and the hydrogen containing molecule to release a hydrogen atom from the hydrogen containing molecule.

The method can further comprise determining whether the material has a catalyst hydride dissociation energy between approximately 0 to approximately 100 kcal/mol before electro-activating the material. The method can further comprise determining whether the material has a difference in electronegativities between atoms in a polar oxide molecule on a surface of the material between approximately 0.3 to approximately 1.4 before electro-activating the material. The method can further comprise combining the electro-activated material and hydrogen containing molecule with a fuel, and generating a chemical reaction between the combination of the electro-activated material, hydrogen containing molecule and fuel to produce hydrogen. The fuel can be one of pure aluminum, aluminum powder, aluminum granules or aluminum shavings.

The method can further comprise controlling the chemical reaction of the combination of electro-activated material, hydrogen containing molecule and fuel to produce hydrogen on demand by heating the combination to increase the production of hydrogen, and by cooling the combination to decrease the production of hydrogen. The combination can be heated to a temperature range between approximately 150 degrees Fahrenheit to approximately 190 degrees Fahrenheit. The hydrogen containing molecule can comprise water, tap water, dirty water, high-calcium water, salt water, sea water, alkaline water or acidic water. The material can be catalyzed aluminum, carbon or lead.

According to another exemplary embodiment of the present disclosure, a system for producing hydrogen is provided, comprising a vessel having a hydrogen containing molecule and an electro-activated material known to have an absolute magnitude of a difference in electronegativities between the material and hydrogen of between approximately 0.08 to approximately 0.36, and an apparatus for generating a chemical reaction between the hydrogen containing molecule and electro-activated material to produce hydrogen.

The system can further comprise a fuel provided in the vessel with the hydrogen containing molecule and electro-activated material, wherein the apparatus generates a chemical reaction between the hydrogen containing molecule, electro-activated material and fuel to produce hydrogen. The fuel can be one of pure aluminum, aluminum powder, aluminum granules or aluminum shavings.

The system can further comprise one or more mechanisms to control the chemical reaction between the hydrogen containing molecule, electro-activated material and fuel to produce hydrogen on demand, wherein the one or more mechanisms heat the combination of the hydrogen containing molecule, electro-activated material and fuel to increase the production of hydrogen, and cool the combination of the hydrogen containing molecule, electro-activated material and fuel to decrease the production of hydrogen.

The hydrogen containing molecule can comprise water, tap water, dirty water, high-calcium water, salt water, sea water, alkaline water or acidic water. The material can have a catalyst hydride dissociation energy between approximately 0 to approximately 100 kcal/mol. The material can have a difference in electronegativities between atoms in a polar oxide molecule on a surface of the material between approximately 0.3 to approximately 1.4. Electrolysis can be provided in the vessel. The material can be catalyzed aluminum, carbon or lead.

The exemplary embodiments of the methods and systems according to the present disclosure allow for hydrogen generation from a liquid composition such as water. Further, the by-products can be a pollution-free source of material for recycling.

BRIEF DESCRIPTION OF THE DRAWINGS

The foregoing and other objects of the present disclosure will be apparent upon consideration of the following detailed description, taken in conjunction with the accompanying drawings and claims, in which like reference characters refer to like parts throughout, and in which:

FIG. 2 illustrates a table that identifies elements that are likely to function as catalysts according to exemplary embodiments of the present disclosure;

FIG. 3(*d*) illustrates a table showing a type of bond formed based on the electronegativity difference according to exemplary embodiments of the present disclosure;

Figure 1:
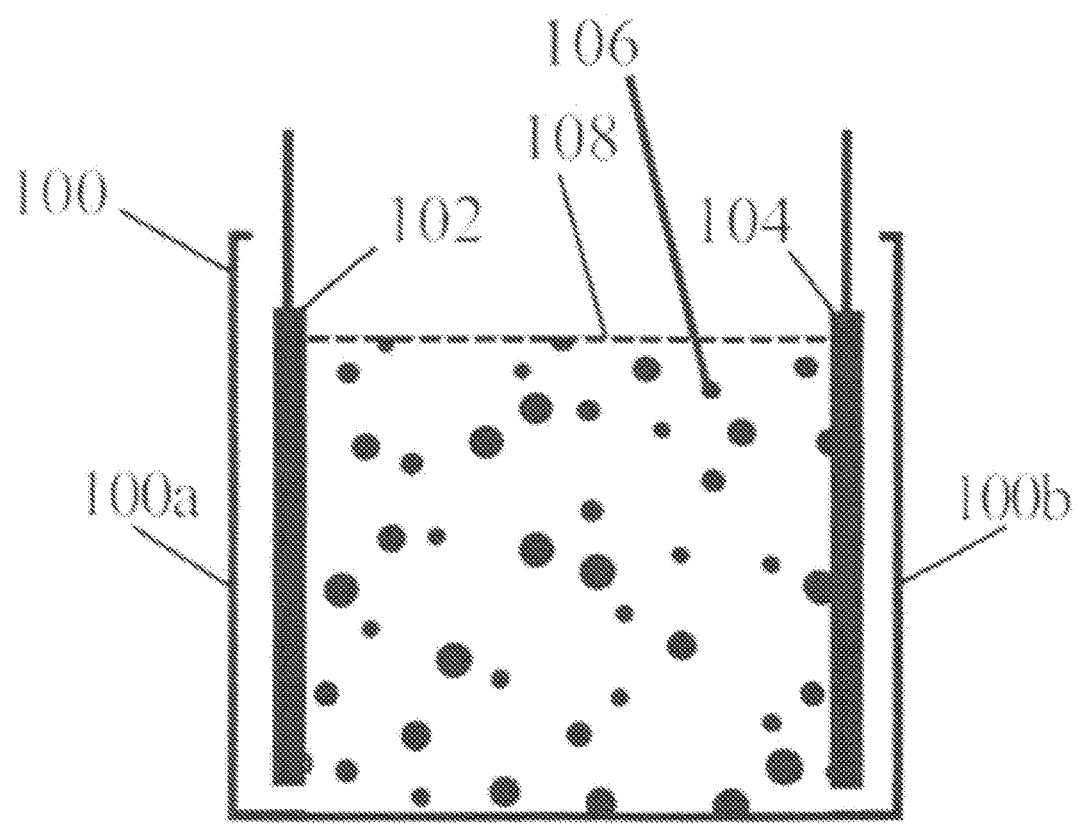
FIG. 1 illustrates an activation cell used to prepare a catalyst that can be used to produce hydrogen according to exemplary embodiments of the present disclosure.

Throughout the figures, the same reference numerals and characters, unless otherwise stated, are used to denote like features, elements, components or portions of the illustrated embodiments. Moreover, while the present disclosure will now be described in detail with reference to the figures, it is done so in connection with the illustrative embodiments. It is intended that changes and modifications can be made to the described embodiments without departing from the true scope and spirit of the present disclosure.

DETAILED DESCRIPTION OF EXEMPLARY EMBODIMENTS OF DISCLOSURE

Exemplary embodiments of the methods and systems according to the present disclosure will now be described, including reference to the figures.

Electro-Activation Process

In an exemplary embodiment of the present disclosure, a method and system for preparing a hydrogen producing catalyst is described. FIG. 1 illustrates a diagram of an activation cell 100 used to prepare a catalyst from a material, such as carbon or lead, that can be used to produce hydrogen. The material can be any type of material contemplated by the present disclosure and is not limited to any particular type or form.

The activation cell 100 can have an anode 102 and a cathode 104. In an exemplary embodiment, the anode 102 can be placed inside the activation cell 100 along a first side 100*a* of the activation cell 100, and the cathode 104 can be placed inside the activation cell 100 along a second side 100*b* of the activation cell 100. The anode 102 can be a metal anode and the cathode 104 can be a metal cathode, and any type of metal can be used for the anode 102 and cathode 104, such as stainless steel, iron, galvanized iron, carbon and/or other metals, and the present disclosure is not limited to any type of metal. The metal can be electrically conductive and resistant to corrosion.

A liquid composition can be provided in the activation cell 100, such as water 108 or other liquid containing hydrogen, or other suitable composition containing hydrogen, and is not limited to any particular composition. The water 108 can be tap water, filtered water, salt water, sea water and/or other types of water. A material 106 can be provided in the water 108 in the activation cell 100 so that it can be electro-activated and converted to a catalyst. The activation cell 100 can be open on a top surface to allow ventilation and the placement of the water 108 and material 106. The water 108 can be in sufficient quantity to, e.g., cover the material being electro-activated. The activation cell 100 can be placed in a well-ventilated area such that any gas that is produced from the liquid during the electro-activation process can be ventilated.

An electrolyte can be placed into the activation cell 100 with the water 108 and material 106, which can make the mixture of the water 108 and material 106 more electrically conductive. Examples of electrolytes that can be used include, but are not limited to, sodium bicarbonate, sodium chloride or potassium hydroxide. The electro-activation can also be carried out with no added electrolyte, and a higher voltage may be used as the water can be less electrically conductive when an electrolyte is not added to the water. Electrical energy can be passed through the mixture of the water 108 and material 106 to electro-activate the material 106. For example, electrical energy, such as in the form of electrical current, can be passed through the mixture of water 108 and material 106 until a value of approximately 6 Ampere-hours is achieved. Also, for example, a range of voltage may be used, such as from approximately 4 volts to approximately 200 volts. Typically, a voltage in the range of approximately 12 volts to approximately 150 volts can be used. The exemplary embodiments of the present disclosure are not limited to any Ampere-hours or voltage, and adjustments may be made based on various factors, such as but not limited to the amount of water, the amount of material (e.g., carbon), the size of the activation cell, and/or other factors including the current density (e.g., Amperes per square centimeter) which can be a function of the geometry of the cell.

The catalytic activation cell 100 can be designed to run at a low current, e.g., less than approximately 5 amps, and can run continuously with no overheating due to power dissipation in the catalytic activation cell 100. This can provide for electro-activation of the material (e.g., carbon), and thereby convert the material into an electro-activated material. For example, carbon can be converted into electro-activated carbon, which can be referred to as catalytic carbon, or lead can be converted into electro-activated lead, which can be referred to as catalytic lead. Electro-activated and catalytic are used interchangeably in the present disclosure to describe the particular catalyst. Electro-activating the material at a low current can provide an advantage that the electro-activation may not need to be monitored to intervene in the event of, e.g., excessive current, excessive temperature or excessive gas emission from the cell.

In other exemplary embodiments of the present disclosure, the catalytic activation cell 100 can be designed to run at higher energy levels, such as 6 Ampere hours, which can be achieved by, e.g., providing electric current for 6 hours at a current of 1 Ampere, or for 3 hours at a current of 2 Amperes. In various embodiments of the present disclosure, different times and currents can be used to achieve 6 Ampere hours. The present disclosure is not limited to any particular Ampere-hours, and other Ampere-hour treatments would also produce catalytic transformation of the material.

The catalyst (electro-activated material 106) can then be removed from the activation cell 100, and may be dried if desired. Once dried, the catalyst may be easier to store and/or ship. The catalyst may be dried by, e.g., air drying, heating in air, and/or other types of heating/drying mechanisms and/or methods. Different drying methods/processes may be used, and temperatures from standard room temperature to up to 200 degrees Fahrenheit can be used, and are not limited to such.

Exemplary Catalytic Reactions

In exemplary embodiments of the present disclosure, the chemical reaction:

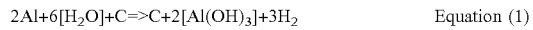

$$2Al + 6[H_2O] + C \Rightarrow C + 2[Al(OH)_3] + 3H_2 \quad \text{Equation (1)}$$

can be used, where Al is aluminum, H is hydrogen, O is oxygen and C is the catalyst (i.e., electro-activated material formed by the process described above. In this exemplary catalytic reaction, the aluminum and water ($H_2O$) can be used as fuels with the catalyst, and hydrogen ($H_2$) can be produced where the by-product is aluminum hydroxide ($Al(OH)_3$). In this exemplary reaction, water and aluminum are fuels that can be consumed, and the catalyst may not be consumed. Other compositions having water, or having hydrogen, can also be used.

The same reaction can be written as:

$$2Al + 3[H_2O] + C \Rightarrow C + Al_2O_3 + 3H_2 \quad \text{Equation (2)}$$

where Al is aluminum, H is hydrogen, O is oxygen and C is the catalyst formed by the process described above. In this exemplary chemical reaction, the aluminum and water ($H_2O$) can be used as fuels with the catalyst, and hydrogen ($H_2$) can be produced where the by-product is aluminum oxide ($Al_2O_3$). Aluminum hydroxide can reduce to aluminum oxide when dried, to remove water from the aluminum hydroxide. Because the hydrogen-producing reaction can be carried out in water, Equation 1 showing an aluminum hydroxide product is the reaction mostly used, while Equation 2 showing an aluminum oxide product can also be used when describing the chemistry. In this exemplary reaction, water and aluminum are fuels that can be consumed, and the catalyst may not be consumed. The catalyst can be increased if the cell operates with electrolysis as the carbon can tend to break into smaller-size granules, providing more surface area. The newly-exposed surface area can then be electro-activated using the effects of electrolysis to promote the growth of a polar oxide on the carbon surface.

Aluminum and Other Fuels

Exemplary embodiments of the present disclosure can provide for aluminum as the fuel as each atom of aluminum can tie up three OH groups to become aluminum hydroxide, Al[OH]$_3$, aluminum can be inexpensive and safe, and aluminum can have a higher chemical binding energy than the OH groups. Aluminum can be provided to help in this reaction as OH groups can be bound to the aluminum (Al) so that the accumulation of free (un-bound) OH groups can be largely prevented, such as in the liquid composition having the catalyst and aluminum, and the recombination with hydrogen atoms to form $H_2O$ can be prevented.

Aluminum, an element that can be used as a fuel in the exemplary embodiments of the present disclosure for producing hydrogen, can react with acids and bases. Like other active metals, aluminum can dissolve in strong acids to evolve hydrogen gas. The catalyst described in the present disclosure can be used in pH-neutral liquid based on its strong catalytic efficiency (i.e., high reaction rate). This can mean that the water can be neither a strong acid nor a strong alkaline liquid, which can provide a very safe and environmentally-friendly mixture.

In some exemplary embodiments of the present disclosure, aluminum shavings can be used in the chemical reactions described herein instead of aluminum powder. The use of an electro-activated material with aluminum shavings and other non-powder forms of aluminum have been shown to successfully produce hydrogen in a laboratory.

For a given mass of aluminum in the reaction, the hydrogen production rate can be approximately proportional to the surface area of the aluminum metal. The aluminum used in some of the exemplary embodiments of the present disclosure can be powdered aluminum. The higher surface-to-volume ratio of powdered aluminum can make it suitable for a higher rate of hydrogen production for a given amount of aluminum. More coarse fuel, which can be in the form of aluminum pellets, aluminum shavings, aluminum granules or aluminum sheets, can also be used. Such coarse fuel can provide for hydrogen production which can be at a lower rate (for a given amount of aluminum) than provided by powdered aluminum in some of the exemplary embodiments of the present disclosure. Use of pure aluminum may not be required, which can make possible the use of lower cost, lower purity aluminum in the hydrogen production according to the exemplary embodiments of the present disclosure.

The size of the aluminum used can be a design variable for a particular application. For example, the particle size of the aluminum can be chosen to achieve a desired hydrogen production rate for a design that has a defined geometry and operating temperature. In general, for a given amount of aluminum, as the particle size of the aluminum decreases, the reaction rate of the chemical reaction described in the present disclosure goes up at any given temperature. Also, the reaction rate increases as the temperature increases.

In some exemplary embodiments of the present disclosure, it was found that hydrogen is generated in the reaction described above without the use of aluminum (i.e., just using an electro-activated material and water), but that adding certain fuels, such as aluminum, increased the production of hydrogen. It was also found that other fuels besides aluminum can be used. It was also found that during the catalytic reaction to generate hydrogen, when aluminum powder is being used, hydrogen generation can increase when the aluminum powder is mixed or stirred during the reaction. A mechanical action can be provided to remove aluminum oxide and aluminum hydroxide, and expose bare aluminum. The chemical reactions described in Equations 1 and 2 produce hydrogen at higher rates when bare aluminum is used, and produce less hydrogen when using aluminum with an oxidized surface. In some exemplary embodiments of the present disclosure, by using a blender or other device to chop/burnish aluminum shavings and pellets, hydrogen production rates increased by factors of approximately two to ten, depending on the intensity of the mechanical or electromechanical action (i.e., chopping, burnishing and/or mixing of the aluminum). The factors can be dependent on the burnishing time and the time delay between burnishing and hydrogen production. This time delay can result in the formation of a film when the bare aluminum surface is exposed to air or water, particularly at temperatures above room temperature. Burnishing of the aluminum can remove the aluminum oxide from the surface of the aluminum, providing a fresh aluminum surface for the hydrogen-producing chemical reactions described in Equations 1 and 2 in the present disclosure.

Aluminum can be a more efficient fuel in the chemical reaction with water and a catalyst when burnished (i.e., using mechanical scrubbing to remove aluminum oxide and/or aluminum hydroxide films covering the surface). If a mechanical action of burnishing or stirring or any other method (e.g., electrolysis) is used to remove the aluminum oxide and/or aluminum hydroxide on the surface of the aluminum, then stopping that process or reducing that process in the hydrogen cell can cause aluminum oxide to form on the surface of the aluminum, which can reduce the hydrogen production. Also, removing the aluminum from the hydrogen cell or from the reaction can also stop the hydrogen production in the hydrogen cell. These control parameters can each be used alone or in combination with one another to slow or stop the hydrogen production, thereby providing hydrogen on-demand.

There may be other methods/devices for removing the oxide/hydroxide and providing a substantially bare aluminum surface for the hydrogen-producing reactions described in the present disclosure, and the present disclosure is not limited to any such method/device. For example, in addition or as a substitute to mechanical burnishing, treatments of the aluminum surface may also be thermal, optical or chemical.

In some exemplary embodiments, aluminum shavings can be reacted with an aqueous solution of sodium hydroxide (NaOH), which can speed the chemical reactions described in the present disclosure reaction by a factor of 10 or more. This process can be a straightforward chemical reaction in which the sodium hydroxide undergoes a chemical change, i.e., the sodium hydroxide is transformed and consumed in the process.

The combination of the aluminum and sodium hydroxide can be combined with the catalytic reactions described in the present disclosure, i.e., Equations (1) and (2). For example, in some exemplary embodiments, hydrogen can be generated according to the following chemical reaction:

$$2Al+2[NaOH]+6[H_2O]+C => C+2[NaAl(OH)_4]+3H_2 \quad \text{Equation (3)}$$

where the Al is aluminum, H is hydrogen, O is oxygen, $NaAl(OH)_4$ is sodium tetrahydroxyaluminate, and C is the catalyst (electro-activated material). In this exemplary reaction, water, aluminum and sodium hydroxide can be fuels that can be consumed, and C can be a catalyst.

In some of these exemplary embodiments, the reaction can begin slowly which can be due to the layer of aluminum oxide on the surface of the aluminum. In these exemplary embodiments, once the layer of aluminum oxide is pierced during the reaction, the reaction can then speed up. In some exemplary embodiments, the reaction sped up after 1 to 3 minutes, at temperatures ranging from standard room temperature up to 180 degrees Fahrenheit. The speed of the reaction can depend on various factors, such as temperature, and the amount of aluminum, water and/or sodium tetrahydroxyaluminate. Other solutions and/or elements may be used to speed up the catalytic reaction, such as salt (NaCl) and/or other electrolytes.

The exemplary embodiments of the present disclosure can produce by-products that are fully recoverable using existing commercial methods for producing aluminum metal. The by-products from the hydrogen production methods and systems according to the exemplary embodiments of the present disclosure can be desirable because they are pure, and can contain no contaminants including bauxite, gibbsite, boehmite, goethite, hematite, kaolinite, and $TiO_2$. The large volume of by-products of the exemplary embodiments of the present disclosure can be $Al(OH)_3$ and $Al_2O_3$, which can be recycled to produce more aluminum metal. Recycling of aluminum hydroxide and aluminum oxide makes the exemplary embodiments of the present disclosure economically viable for large volume hydrogen production. $Al(OH)_3$ and $Al_2O_3$ can also be used commercially without any recycling expense, as $Al(OH)_3$ can been used as pharmaceutical ingredients, and $Al_2O_3$ is a commonly used abrasive material, as well as a commonly used ceramic material.

Aluminum refining from aluminum-bearing bauxite ore can use the Bayer process chemistry which can form a hydrate which can be essentially the same as the reaction product in the aluminum-water reactions described above according to the exemplary embodiments of the present disclosure. The hydrate can be calcined to remove the water to form alumina. The alumina can then be electrolytically reduced into metallic aluminum at about 900 degrees Celsius using the Hall-Heroult Process, producing aluminum metal with 99.7% purity.

In some exemplary embodiments, a catalyzed aluminum was used which was found to generate hydrogen at rates that were 30% higher than using regular aluminum. The catalyzed aluminum can be a combination of aluminum and a material catalyst (e.g., carbon or lead or other material which can be a catalyst once electro-activated).

In some exemplary embodiments, the catalyzed aluminum can be made of scrap materials, such as aluminum and a material such as paper. These two materials can be oxidized at a high temperature which can reduce the paper to carbon. In a first step, the scrap paper and scrap aluminum can be converted into carbonized aluminum. This can be carried out at, e.g., temperatures high enough to carbonize the paper but lower than the melting temperature of aluminum. The materials often used for this process can be integrated, much like the aluminum foil on paper that is sometimes used for wrapping products such as chewing gum. Because the paper and aluminum are scrap materials, this can be a very low-cost starting material when used in high volume manufacturing.

The aluminum-material (i.e., aluminum-carbon) mixture can then be chemically activated to transform the material into a catalyst, such as carbon into catalytic or electro-activated carbon. For example, the aluminum-material mixture can be placed into a vessel and electro-activated. The aluminum itself is not a catalyst, but it is "catalyzed" by the presence of the catalyst, such as the electro-activated carbon. The catalyzed aluminum can be mostly aluminum, and can have a carbon (or other material) content of less than 2%, and is not limited to this or any particular range. The carbon can be in direct physical contact with the aluminum, making the hydrogen production process very efficient.

The catalyzed aluminum granule size can be approximately 30 microns to approximately 0.2 mm, making it safe to handle in dry air. The aluminum granule size is not limited to any particular size. When the catalyzed aluminum is used to split water or other hydrogen containing material, hydrogen can be released in the form of a gas, and the oxygen can remain in the water in the form of aluminum hydroxide. The low cost of producing hydrogen using catalyzed aluminum can result in the aluminum hydroxide simply being discarded, or it can be recycled, or aluminum oxide can be used for other industrial purposes.

There can be several advantages of using catalyzed aluminum. The use of catalyzed aluminum can be more simple than using aluminum and an electro-activated material (i.e., catalyst). For example, using catalyzed aluminum can provide for just the addition of water in order to produce hydrogen. Further, the catalyzed aluminum granule size can be optimum for hydrogen production. A larger granule size (i.e., lower surface-to-volume) would result in a slower production of hydrogen per pound of fuel, possibly requiring more fuel and a larger vessel to produce hydrogen at a given rate. A smaller granule size (higher surface-to-volume) can result in the fuel being consumed more quickly to produce hydrogen at a given rate.

Further, catalyzed aluminum can be safe to handle, ship and store based on the granule size. If aluminum powder is used to make hydrogen, the aluminum powder may possibly become chemically unstable, and possibly explosive, if the powder has a particle size less than 30 microns. Catalyzed aluminum can have an average granule size of approximately 30 microns to approximately 200 microns. The ratios of aluminum and the catalyst can be optimized in the formulation and manufacturing of catalyzed aluminum. The ratio of aluminum to carbon can be higher when catalyzed aluminum is used (e.g., instead of the catalyst and aluminum). Catalyzed aluminum can be almost all fuel, such as more than 98% aluminum and less than 2% catalyst (e.g., carbon). Further, the mixture of catalyzed aluminum and water is not critical. Each aluminum granule can have a local source of catalyst integrated into the granule.

Some chemicals may be even more helpful than aluminum such as barium oxide (BaO), which can tie up as many as four or five OH groups. Some experiments have shown that barium oxide can be a very good fuel with regard to hydrogen production, although there can be some safety issues and can generally be more expensive than aluminum. Other elements, chemicals or fuels having the same effect as aluminum can also be used. For example, chemicals that tie up one OH group can be helpful, such as but not limited to Li (can form lithium hydroxide), Na (can form sodium hydroxide), K (can form potassium hydroxide), Rb (can form rubidium hydroxide), Cs (can form cesium hydroxide) and Si (can form silicon hydroxide). Other chemicals can be more helpful, which can tie up two OH groups, such as but not limited to Ca (can form calcium hydroxide), Sr (can form strontium hydroxide) and Ba (can form barium hydroxide).

Additives

A chemical additive can be used with the catalysts in the exemplary embodiments of the present disclosure. For example, an electrolyte can be added for the purpose of increasing the electrical conductivity of the liquid in a hydrogen producing cell. This can be needed to make a cell suitable for, e.g., electrolysis, which requires the flow of electrical current through the liquid in the hydrogen cell. The use of an electrolyte additive may be needed for a cell containing water. Similarly, the use of an electrolyte additive may be needed for a cell containing any hydrogen-containing substance. Common additives that can be used for this purpose include sodium chloride (salt, or NaCl), sodium hydroxide (NaOH), sodium bicarbonate (NaHCO3), and/or potassium hydroxide (KOH). Additives can also be used for the addition of "defoaming agents" to help suppress frothing when the hydrogen is delivered at high rates from a hydrogen cell.

Figure 3A:
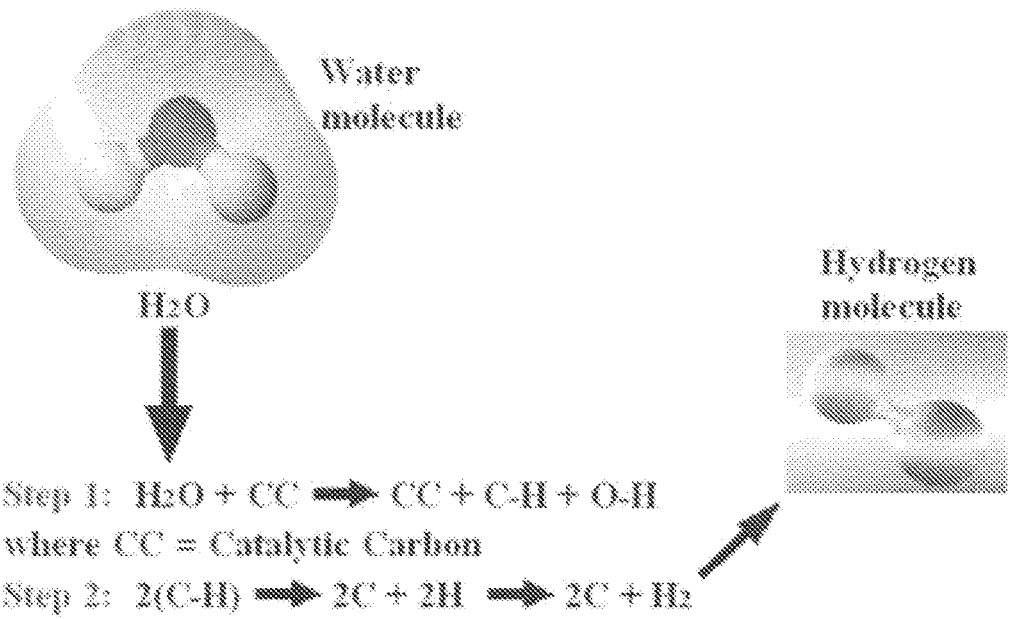
FIGS. 3(*a*)-3(*c*) illustrate chemical reactions according to exemplary embodiments of the present disclosure.
Figure 3B:
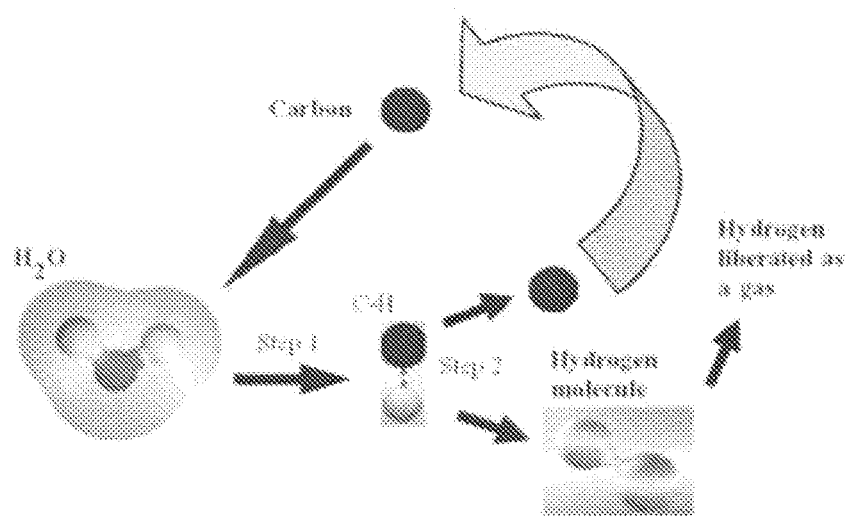
Figures 3C, 3D:
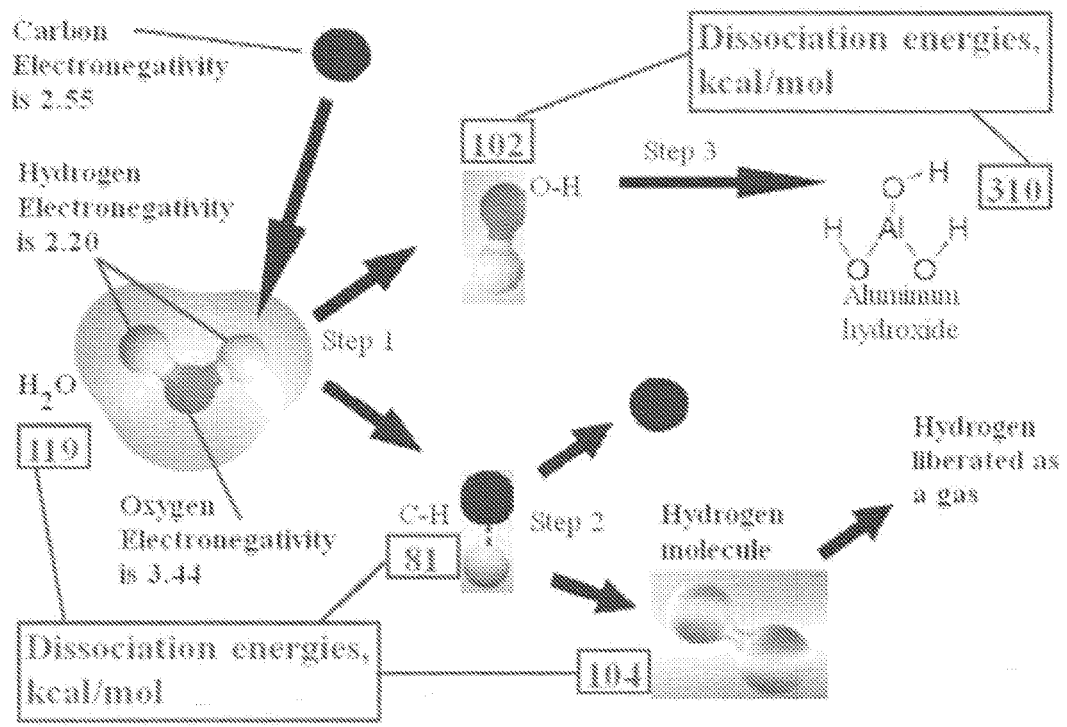

Additives can also be used for the purpose of causing a catalytic sequence, as described in Steps 1-3 in FIGS. 3(a)-3(c). For example, step 1 (where hydrogen is robbed from any hydrogen-containing molecule ("H-molecule") to create a C—H molecule) can operate with any desired chemical additive as follows:

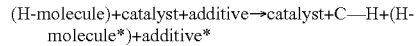

(H-molecule)+catalyst+additive→catalyst+C—H+(H-molecule*)+additive*

In the above reaction, the H-molecule can be any hydrogen-containing molecule, and the H-molecule* is what is left of the original H-molecule after a hydrogen atom is robbed from the original H-molecule. In the above reaction, the additive molecule is any molecule which is added to achieve a desired effect. The additive* molecule is what is left of the original additive molecule after the effect of chemical reaction(s), mixing, or electrolysis to dissociate or otherwise modify the original additive molecule.

Catalysts

Various catalysts have been found to be able to produce hydrogen from water once electro-activated, as will be shown below. Certain factors may enable some elements to be better catalysts for producing hydrogen from hydrogen containing molecules, such as water, than other elements. Some of these factors include an absolute magnitude of the difference in electronegativities between a catalyst and hydrogen, a catalyst hydride dissociation energy and/or a difference in electronegativities between the atoms in a polar oxide molecule on a surface of a catalyst.

Electronegativity can be a measure of the relative tendency of an atom to attract electrons to it when chemically combined with another atom. Electronegativity, as it is usually calculated, may not be strictly a property of an atom, but can be a property of an atom in a molecule. The electronegativity of an element can vary with its chemical environment. The most commonly used range of electro-negative uses a system of numbers proposed by Linus Pauling. This gives a dimensionless quantity, commonly referred to as the Pauling scale, on a relative scale running from around 0.7 to 3.98 (e.g., hydrogen electronegativity is 2.20).

The reason electronegativity can be important for purposes of the present disclosure can be that electronegativity can influence the formation of catalyst groups (e.g., C—H groups) to take a hydrogen atom from water. The frequent formation of C—H groups, and the subsequent dissociation of those C—H groups are known characteristics which can be central features of the exemplary embodiments of the catalyst systems of the present disclosure.

In the field of chemistry, C—H (the hyphen implies a chemical bond between the carbon and hydrogen) is known as a hydride. The C—H bond is a bond between carbon and hydrogen atoms, most commonly found in organic compounds. C—H molecules seldom exist alone, as stable molecules. For these reasons, C—H is sometimes referred to as a molecule and sometimes referred to as a chemical group. Molecules are usually thought of as having good chemical stability (C—H does not), and having a relatively high dissociation energy (C—H does not).

The reason for the importance of the C—H group is because it is the first step in a sequence that describes the chemical separation of hydrogen from water, as shown below:

$$H_2O + C => C—H + O—H \qquad \text{Equation (4)}$$

The reason electronegative difference can be important is that covalent bonds are very strong, and have more strength if the electronegativity difference is small. Using Pauling's electronegativity scale, carbon has an electronegativity of 2.5 and hydrogen has an electronegativity of 2.1, so that the electronegativity difference between these two atoms is 0.4. Therefore, C—H molecules should form readily and because of the strong covalent bonds the C—H molecules should be chemically stable, although they are not. The carbon and hydrogen atoms will not remain together, and they cannot keep other atoms away. The favorable and frequent formation of C—H groups, and the subsequent dissociation of those C—H groups are characteristics which can be important aspects of these groups for the catalysts systems described in the exemplary embodiments of the present disclosure.

In the exemplary embodiments of the present disclosure, the absolute magnitude of the difference in electronegativities between the catalyst and hydrogen can be an important feature in determining which catalysts are likely to be good catalysts for electro-activation and use in generating hydrogen. The absolute magnitude accounts for both a primary range (positive) and a mirror range (negative). In the exemplary embodiments of the present disclosure, a preferred range on the Pauling scale can be approximately 0.08 to 0.36. Such a range can lead to identification of elements most likely to function as catalysts useful in extracting hydrogen from water or other hydrogen-containing materials.

The table shown in FIG. 2 identifies elements most likely to function as catalysts. Having an absolute magnitude of an electronegativity difference lower than the preferred range can result in the formation of a strong covalent bond for the Step 1 product (as shown in FIG. 3(a)), thereby stopping the sequence because that product would not easily dissociate. Having an absolute magnitude of an electronegativity difference higher than the preferred range can result in a bond that is too weak (polar-like) and may not be strong enough for Step 1, during which the catalytic element must steal a hydrogen atom from a water molecule. For example, lead (Pb) and tungsten (W) may be catalysts as the electronegativity difference is 0.13 and 0.16, respectively, as shown in the table of FIG. 2. Lead (Pb) may be a better catalyst than tungsten (W) because of other factors, including the formation of a polar oxide (with the right characteristics) on the metal surface.

Another important characteristic in determining which element or molecule can be a catalyst useful in extracting hydrogen from water or other hydrogen-containing materials can be the dissociation energy. Dissociation energy, in the field of physical chemistry, is the energy required for complete separation of the molecule into two or more parts. Dissociation energy can be important for complete separation of the atoms in the, e.g., C—H group. An array of atoms held together by covalent bonds forms a true molecule. The C—H hydride can be considered a "group" because it is a molecule with special characteristics. The C—H group is a hydride, there is only a small difference in electronegativity so the two atoms share the electrons. The result is a covalent bond (which can be depicted as C:H or C—H), and the atoms are held together by their mutual affinity for their shared electrons.

Separation of the atoms in the C—H group can liberate the hydrogen. Separation of the atoms in the C—H group is Step 2 in a sequence that describes the chemical separation of hydrogen from water, as shown in FIG. 3(a) and FIG. 3(b). FIG. 3(a) shows the chemical separation of hydrogen from water by chemical equations and FIG. 3(b) shows the chemical separation of hydrogen from water in the form of a physical model. In FIG. 3(a), "CC" means catalytic carbon or electro-activated carbon.

In FIG. 3(c), "C" means catalytic carbon or electro-activated carbon. As shown in FIG. 3(c), C—H can have a weak bond and can be likely to dissociate. In Step 1, because of similar electronegativities, carbon can form a stronger bond with hydrogen than can oxygen. Carbon competes with oxygen and steals hydrogen from the water molecule (formation of a transient C—H group), leaving behind a stable OH group. The formation of the C—H group is very favorable, but the instability of the C—H group causes it to exist as a group for only a short time. In Step 2, the C—H group dissociates. The hydrogen atom combines with another hydrogen atom (equal electronegativities, leading to a strong covalent bond). The resulting hydrogen molecule (a gas) escapes from the liquid. After C—H dissociation, the free carbon atom repeats the cycle (Step 1). In Step 3, aluminum can be more reactive than carbon, and an aluminum atom can acquire the O—H group. Similarly, it can acquire two additional O—H groups to form aluminum hydroxide.

The comparison of dissociation energies in FIG. 3(c) shows that a good catalyst can form a hydride with a low dissociation energy, to aid in the complete separation of the atoms in the C—H group. A range for the catalyst hydride dissociation energy can be from approximately zero to approximately 100 kcal/mol. A catalyst hydride dissociation energy higher than this range may not be suitable because the high dissociation energy of the Step 1 product may not be favorable to Step 2 in which the Step 1 product must easily dissociate. The separation of the C—H group can require less energy than the separation of atoms from any other molecule in the chemical sequence described in FIGS. 3(a) and 3(b). Separation of the atoms in the C—H group liberates the hydrogen. For example, lead can be a possible catalyst because Pb—H has a lower dissociation energy than C—H, and Tungsten (W) can also be a possible catalyst because W—H has a lower dissociation energy than C—H.

Another important characteristic in determining which element or molecule can be a catalyst useful in extracting hydrogen from water or other hydrogen-containing materials can be the difference in electronegativities between the atoms in a polar oxide molecule on a surface of the catalyst. A polar oxide can be an oxide composed of molecules that are polarized molecules. A polar molecule can be a molecule in which the centroid of the positive charges can be different from the centroid of the negative charges. A polar molecule can also be referred to as a dipole.

Electronegativity can be a measure of the tendency of an atom to attract a bonding pair of electrons. The Pauling scale is the most commonly used measure of electronegativity. Fluorine (the most electronegative element) is assigned a value of 4.0, and values range down to Caesium and Francium which are the least electronegative at 0.7 on the Pauling scale. The reason electronegativity can be important is that only a certain range of electronegativity values can lead to the formation of the polar oxide desired for a good catalyst. A preferred electronegativity range can be as shown in the table of FIG. 3(d), which can be approximately 0.3 to approximately 1.4 (on the Pauling scale) for the difference in electronegativities between the atoms in a polar oxide molecule on the surface of a catalyst.

Elements that form a weakly-bonded polar surface may well be suited for use as hydrogen-producing catalysts. Lead (Pb) forms complex oxides, and therefore, might be likely to have one or more surface oxides that are weakly-bonded polar surface oxides. Tungsten (W) forms a smaller number of oxides and therefore might not be likely to have one or more surface oxides that are weakly bonded polar surface oxides. Therefore, although tungsten may have a suitable absolute magnitude electronegativity difference and dissociation energy as described above, it may not be a suitable catalyst as lead and carbon may be.

Electro-Activation

Electro-activation aids in the chemical processes described above. As shown in Step 1 in FIGS. 3(a)-3(c), carbon (or other catalyst) must steal a hydrogen atom from water, which normally holds two hydrogen atoms with oxygen-to-hydrogen bonds. Normal carbon (or other catalyst) may do this with a low reaction rate, but to increase this reaction rate to make carbon a more effective catalyst, the carbon atoms can be electrically polarized on the surface of carbon particles.

A difficulty in electrically polarizing carbon atoms on the surface of carbon particles can be that carbon is an electrical conductor, and a conductor will not remain polarized after the electrical field is removed. However, it is possible to polarize the oxide on the surface of the carbon particles. An oxide dielectric can be polarized and will remain polarized after the electrical field is removed. Solid carbon can be electrochemically oxidized and the final distribution of the products can be dominated by the equilibrium of the Boudouard reaction ($C+CO_2 \leftrightarrows 2CO$).

Carbon forms two oxides at the surface, carbon dioxide and carbon monoxide. Carbon monoxide has a dipole moment, and carbon dioxide is different. This bond is naturally polarized as illustrated below:

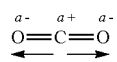

Oxygen attracts electrons more effectively than carbon. Therefore, the carbon-oxygen bond is polarized. A partial negative charge is centered on each oxygen atom (because of the small excess of electron density) and a partial positive charge is centered on the carbon atom (because of the slight deficiency of electron density). Because the molecule is linear and the two bond dipoles are equal in magnitude and oppositely directed, the whole molecule is still not polar (the whole molecule has a zero dipole moment).

Molecules with mirror symmetry like oxygen and carbon dioxide have no permanent dipole moments. Even if there is no permanent dipole moment, it is possible to induce a dipole moment by the application of an external electric field. This is called polarization and the magnitude of the dipole moment induced is a measure of the polarizability of the molecular species.

This kind of polarization can be induced by the application of an electric current through the material (electro-activation). The CO molecule has a small negative charge on carbon and a small negative charge on oxygen.

Carbon and oxygen together have a total of 10 valence electrons. Since four of the shared electrons come from the oxygen atom and only two from carbon, one of the bonding orbitals is occupied by two electrons from oxygen, forming a dative or dipolar bond. This causes a polarization. Polarity can refer to a separation of electric charge leading to a molecule or its chemical groups having an electric dipole or a multipole moment. Polar molecules interact through dipole-dipole intermolecular forces and hydrogen bonds. The CO molecule has a small negative charge on carbon and a small positive charge on oxygen.

Normal carbon, before electro-activation, may have a native oxide film, which may have the oxide molecules partially non-aligned. During electro-activation, the carbon surface will be more densely oxidized. After electro-activation, the carbon surface will tend to have the oxide molecules aligned, leaving any non-oxidized (bare) regions on the carbon surface with an induced negative surface charge. Both CO and $CO_2$ form as a gas, and some of these molecules will escape into the water, leaving behind microscopically-small bare (non-oxidized) regions of the carbon surface.

The carbon surface has a negative induced charge, similar to the mirror charge that is produced on the plate of a parallel-plate capacitor. The other pseudo plate that mirrors the charge is the positive oxygen ends of the CO molecules. The electrical potential is the same on all carbon surfaces, because carbon is a conductor.

As a portion of a water molecule, a hydrogen atom (which is partially electron depleted, and has a positive single-proton nucleus) will be attracted to the negative surface of the carbon. This attraction between the hydrogen and the carbon aids in the action of the carbon to steal a hydrogen from the water molecule, thereby creating a C—H molecule as part of Step-1 of the catalytic process.

Accordingly, any element or molecule that can form a polar oxide surface layer in water can be a candidate for electro-activation to convert it into a hydrogen-producing catalyst in water. Accordingly, any element or molecule that can be used in the electro-activation process to convert it into a hydrogen-producing catalyst, the element (and/or molecule) or its oxides can be water compatible. This can mean preferably soluble in water, or existent in water in the form of a colloid suspension.

Further, compound molecules (combinations of elements) may also be good catalysts if they provide the same requirements as described for elements in the exemplary embodiments of the present disclosure.

According to the exemplary embodiments of the present disclosure, many different forms of materials can be electro-activated as described above to produce a catalyst. For example, in various experiments performed according to the exemplary embodiments of the present disclosure, it has been shown that hydrogen can be produced using a catalyst material in various forms, such as solid, liquid or other forms of the particular element, such as carbon or lead.

Further, a fuel may not be required in order to generate hydrogen. Experiments have shown that the catalyst alone with a hydrogen containing composition, such as water or composition containing water, can produce hydrogen with a catalyst C, according to the reaction:

$$H_2O + C => C + H + OH \qquad \text{Equation (5)}$$

A fuel can, however, increase the rate of production of hydrogen in the chemical reactions shown in Equations (1) and (2). When hydrogen atoms are generated, they can tend to combine, as in $H+H => H_2$ (a gas), which is referred to as the Toffel reaction. A competing reaction can also occur, such as $H+OH => H_2O$, a "recombination" reaction that can prevent the hydrogen from being liberated in the form of $H_2$ gas.

The exemplary embodiments of the present disclosure can use a hydrogen containing material (e.g., water) and aluminum (or similar material) as fuel for the exemplary chemical reactions described herein. The potential use of water from various sources and lower cost, lower purity aluminum can provide for alternative low-cost sources that can be used to provide fuels for the catalytic reactions according to the exemplary embodiments of the methods and systems of the present disclosure.

According to the exemplary embodiments of the present disclosure, water can be used from various different sources. The use of pure water may not be required. Therefore, it may not be necessary to use distilled water or de-ionized water for the production of hydrogen, which can be more expensive than, e.g., tap water or sea water. In exemplary embodiments of the present disclosure, various water sources were used in the exemplary chemical reactions, including tap water, dirty water, high-calcium water, salt water, sea water, alkaline water, and acidic water. In these experiments, it was found that all these various water samples worked well in the chemical reactions of the exemplary embodiments of the present disclosure for hydrogen production. In some exemplary embodiments of the present disclosure, it was found that some forms of water, including salt water and alkaline water, can provide a slightly higher rate of hydrogen production than more pure forms of water, such as deionized water or distilled water. This can be because salt water and alkaline water can have additives that can tend to ionize the water, which can make it more chemically active and/or more mobile in an aqueous solution. This can be because electrostatic fields, created by the polar oxides, form forces that move the chemicals in the liquid. An electrolysis environment can also form forces that move the chemicals in the liquid.

The use of water from various sources can provide, e.g., more design latitude and freedom to a user in selection of construction materials for a hydrogen cell, water and water ingredients to minimize corrosion of the materials used in the construction of a hydrogen cell and associated parts according to the exemplary embodiments of the present disclosure. Such use of water from various sources can provide for significant cost reduction by, e.g., making it possible to use a wider range of materials.

The use of salt water and/or sea water for hydrogen production according to the exemplary embodiments of the present disclosure can make it suitable for marine applications, as well as providing an energy source for coastal areas. The exemplary embodiments of the present disclosure can provide hydrogen production in all parts of the world and near any seashore, including remote islands. Accordingly, many island nations can use the exemplary embodiments of the present disclosure to, e.g., decrease fuel costs and reduce or eliminate the need for tanker-ship import of fossil fuels.

Further, the catalyst described in the exemplary embodiments of the present disclosure can be used to obtain hydrogen without requiring aluminum or water. For example, the catalyst can be used to obtain hydrogen by splitting other molecules. Hydrogen-robbing from any hydrogen-containing molecule can be similar for other molecules than water, e.g, such as for step 1 in the chemical reaction sequence as described in FIGS. 3(a)-3(c). The chemical reactions describe the same hydrogen-robbing step, used to obtain a C—H molecule from either a water molecule or from a hydrogen-containing molecule. For example, when the water molecule $H_2O$ is split apart, the O—H molecule is simply what is left of the original water molecule after a hydrogen atom is robbed from the original water molecule. Further, other hydrogen molecules may be used with the catalyst to split the hydrogen molecule, such as but not limited to wood, diesel or kerosene.

Experimental Data

Experiments were conducted to determine whether the electro-activation of a material, e.g., carbon, can increase hydrogen production. Electro-activated carbon, electro-activated lead and electro-activated tungsten were used in an experiment with water and aluminum, and heated to determine hydrogen production, and the rates of hydrogen generation.

The tests described above have shown that the catalysts prepared according to the exemplary embodiments of the present disclosure can be an excellent material for use in splitting water to produce hydrogen at high rates of production. Further, the tests showed that after the catalyst is electro-activated according to the exemplary embodiments of the present disclosure, an enhanced effect as a catalyst can be semi-permanent, lasting up to several weeks and even months. Long long-term storage of the catalyst in a damp or wet environment can preserve the effectiveness of the catalytic properties of the catalyst for months and even years.

The catalytic carbon is reusable (i.e., the catalytic effect of the electro-activation is preserved). The catalytic carbon can be stored and used months later, having the same effect as a fresh catalyst (i.e., catalytic carbon) with water and aluminum as fuels. Further, the catalytic carbon can be used several times over with water and aluminum being the only consumed fuels in the exemplary catalytic reactions described in the present disclosure.

In some exemplary embodiments, it was shown that catalytic carbon, in trace amounts, can be left behind in the vessel/hydrogen cell even after washing/cleaning of the vessel/hydrogen cell. Accordingly, in some experiments where electro-activated carbon was not used, but was used previously in the same vessel, some hydrogen production was noted when there should have been close to none. Accordingly, using the same vessel over and over can provide certain advantages when using catalytic carbon to produce hydrogen.

In some exemplary embodiments, it was found that "wet" electro-activated carbon (i.e., electro-activated carbon still wet from the water in the electro-activation process) produced hydrogen generation rates that were approximately 5-10% higher than the hydrogen generation rates produced when the catalytic carbon was dried. This can be because the wet catalytic carbon can have less surface-modification history. Washing the catalytic carbon can involve some minor surface changes at the surface of the carbon. Drying the catalytic carbon can also allow for possible surface abrasion when the carbon particles are moved, shifted or poured. Catalytic carbon is a surface-reacting heterogeneous catalyst. In some exemplary embodiments, it has been shown that the carbon surface immediately following the electro-activation process can be optimum for hydrogen generation, and any surface treatment or damage following electro-activation (e.g., washing or drying) can result in slightly-reduced catalytic effectiveness when the catalytic carbon is used to split water and produce hydrogen in accordance with the catalytic reactions described in the present disclosure.

Carbon can exhibit good tendencies for electro-activation and use as a catalyst in hydrogen production with water. Carbon is an element that can have electronegativity similar to hydrogen and can form a polar bond with hydrogen. Carbon can form a polar oxide surface layer in water, and carbon can be pseudo-soluble in water in the form of a colloidal suspension of carbon particles in water.

The tests described above provide that catalytic lead prepared according to the exemplary embodiments of the present disclosure can be an excellent material for use in splitting water to produce hydrogen at high rates of production. Lead powder was electro-activated and oxidized at a current of approximately 1 ampere, for 9 ampere-hours. The electro-activated lead powder was mixed with aluminum powder and water, and heated. At approximately 148 degrees Fahrenheit, hydrogen generation occurred at a sufficient rate. At approximately 162 degrees Fahrenheit, the hydrogen generation was significant at almost double the rate as at 148 degrees Fahrenheit. This confirms that lead works, as lead has an acceptable/desirable electronegativity difference between the catalyst and hydrogen, a dissociation energy, and a difference in electronegativities between the atoms in a polar oxide molecule on the surface of the catalyst in the ranges described above.

The tests described above provide that the catalytic tungsten prepared according to the exemplary embodiments of the present disclosure may not be an excellent material for use in splitting water to produce hydrogen at high rates of production. Tungsten powder was electro-activated and mixed with aluminum powder and water, and heated. However, there was no significant hydrogen generation. This confirmed that although tungsten had an electronegativity difference between the catalyst and hydrogen and a dissociation energy in the ranges described above, the unsuitable characteristic of the tungsten oxide (as they are not polar oxides), makes tungsten undesirable for use as a catalyst in the production of hydrogen as described in the exemplary embodiments of the present disclosure.

Figure 4:
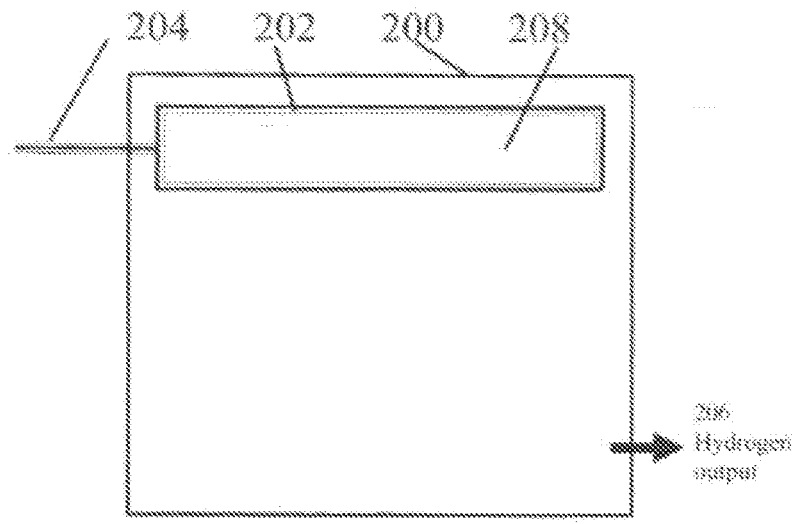
FIG. 4 illustrates a system for the production of hydrogen according to exemplary embodiments of the present disclosure.

FIG. 4 illustrates a system for the production of hydrogen according to exemplary embodiments of the present disclosure. A hydrogen cell 200 can be provided where a heating subunit 202 can be provided having a heating element 208 within. The heating element 208 can be of various types, such as an electrical heater, a glow plug, a heat-exchanger coil with hot water running through it, or an electrolysis unit, but is not limited to such. A power supply, such as, e.g., a wire 204, can be provided to power the heating subunit 202 and/or heating element 208. If hot water is used to provide heat to the heating element 208, 204 can represent the input/output of the hot water. In other embodiments, the heating element may run independently on a battery and/or may be within the hydrogen cell 200. Within the hydrogen cell 200, aluminum and water (or other hydrogen containing molecule) can be provided as, e.g., fuels, and a catalyst, such as electro-activated carbon or lead. The catalyst, water and aluminum can be in contact with each other in a mixture in the hydrogen cell 200 as needed to, e.g., heat the mixture of the catalyst, water and aluminum.

In an exemplary embodiment of the present disclosure, one part catalyst can be provided with one part aluminum, which can be in the form of aluminum powder, flakes or granules, with approximately three parts water, in the hydrogen cell 200. An important requirement can be that the carbon concentration must be high at the surface of the aluminum. This can be achieved in practice by ensuring that "black water" is used in the cell. If the water is black, because of a high concentration of catalytic carbon, the concentration of catalytic carbon has been shown to be high enough to produce hydrogen according to the processes described herein. Various ratios of the catalyst, aluminum and water can be used, and the present disclosure is not limited to any particular ratio.

The mixture of the catalyst, water and aluminum can then be heated using the heating element 208 to a temperature of approximately 140 degrees Fahrenheit to approximately 190 degrees Fahrenheit. The present disclosure is not limited to any temperature ranges, and various temperatures may be used according to different embodiments of the present disclosure. For example, different catalysts may operate and peak at different temperatures. In some exemplary embodiments, the mixture can be heated to approximately 180 degrees Fahrenheit, which can prevent excessive loss of water due to vaporization or boiling. Water evaporation (and heat loss, or cooling) can be controlled and limited by operating the hydrogen cell in a temperature range of approximately 160 degrees Fahrenheit to approximately 180 degrees Fahrenheit that is below the boiling temperature of water (i.e., 212 degrees Fahrenheit at sea level). From the equations described above, the reaction produces hydrogen and aluminum hydroxide, and the hydrogen can be collected at hydrogen output 206. Hydrogen, a light gas, collects in the upper regions of the cell 200. The hydrogen output 206 can be connected by a tube to the higher region of the space in the cell 200. The aluminum hydroxide can be collected within the hydrogen cell 200 or outside of the hydrogen cell 200, using appropriate structures and elements.

Figure 5:
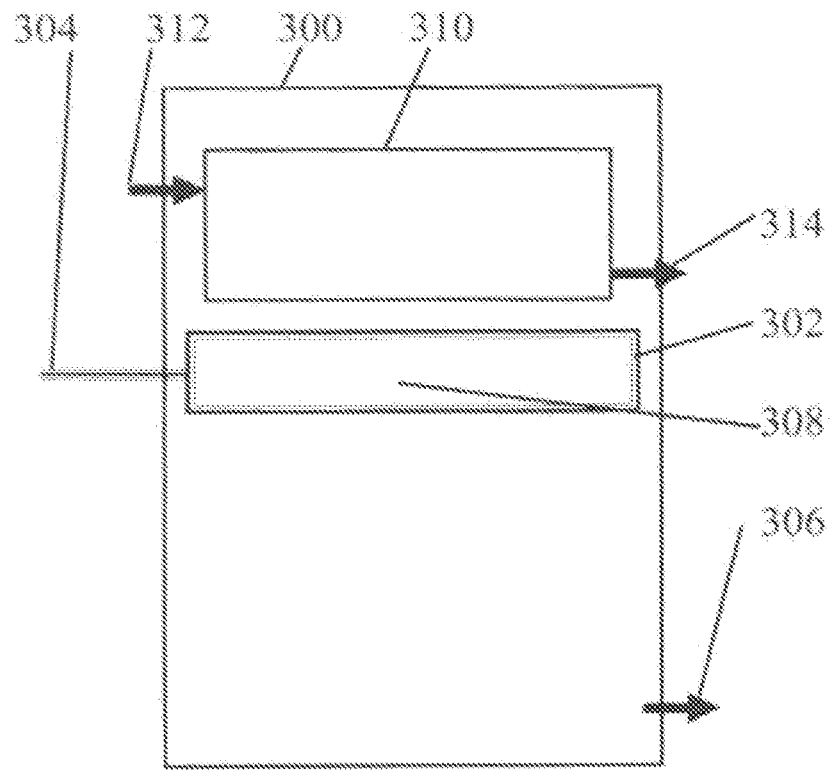
FIG. 5 illustrates a system for the production of hydrogen according to exemplary embodiments of the present disclosure.

FIG. 5 illustrates a system for the production of hydrogen according to exemplary embodiments of the present disclosure. The system of the exemplary embodiment of FIG. 5 is similar to the system in the exemplary embodiment of FIG. 4, which can have a hydrogen cell 300, a wire 304 providing electrical power to a heating element 308 within a heating subunit 302, where a catalyst, aluminum and water are provided. The heating element 308 heats the mixture of the catalyst, aluminum and water to produce hydrogen and aluminum hydroxide, and the hydrogen can be collected at hydrogen output 306. In addition, the exemplary embodiment of FIG. 5 can have a cooling subunit 310. For example, the cooling subunit can have within a cooling coil having a cold water input 312 and a water output 314. The cooling coil can be in contact with the mixture of water, aluminum and catalyst. The cooling can slow down the reaction process, thereby decreasing the rate and volume of hydrogen generation. Such a system can be used to produce hydrogen on demand, where appropriate control instruments and tools can be used to produce the temperatures needed to increase and slow down the rate and volume of hydrogen generation.

The exemplary system of FIG. 5 can provide hydrogen "on-demand." Heating the hydrogen cell 300 can increase the temperature and increase the hydrogen production. Factors (i.e., control parameters) that can be considered when generating hydrogen and increasing the hydrogen production can be the amount of water, amount of electro-activated catalyst, amount and type of aluminum, the manner and rate of oxide/hydroxide removal from the aluminum surface, and the temperature. In some embodiments, the cell can be charged with a continuing rate of aluminum granules and water, so that the fuel elements are provided "on demand" in a manner similar to the way that gasoline and air is provided to a typical internal combustion engine.

Cooling the hydrogen cell (e.g., by providing cold water into the hydrogen cell) can reduce the temperature, thereby reducing the hydrogen production. When providing hydrogen on-demand, various factors (i.e., control parameters) can be considered in order to decrease the rate of hydrogen production. For example, if the amount of water is reduced, such as by removing the water from the hydrogen cell, this can slow or stop the production of hydrogen. Reducing the amount of catalyst can also reduce the amount of hydrogen production, although it can be difficult to completely remove all the catalyst, as trace amounts may still be in the hydrogen cell. Reducing the temperature in the hydrogen cell can also reduce the hydrogen production. For example, reducing the temperature of the hydrogen cell by approximately 18 to 20 degrees Fahrenheit can reduce the hydrogen production rate in the hydrogen cell by a factor of approximately 2. Reducing the temperature of the hydrogen cell by approximately another 18 to approximately 20 degrees Fahrenheit can again reduce the hydrogen production in the hydrogen cell by a factor of approximately 2, and so on. This can be done by using a cooling subunit 310, or other devices/methods to reduce the temperature of the hydrogen cell 300.

The systems described in the present disclosure can be combined with existing systems for producing hydrogen in some exemplary embodiments of the present disclosure. For example, a hybrid system can be provided for producing hydrogen that combines the system(s) of the present disclosure with an electrolysis system. An electrolysis system can produce significant heat, and that heat can be used to start or to keep up the reactions described in the present disclosure. For example, the heat from an electrolysis system can start or keep up the reaction of Equation 1, where water, aluminum and electro-activated carbon are heated to produce hydrogen. The hydrogen produced from either one or both systems can then be used for the particular purpose. This can provide a method and system where pH-neutral chemistry can be used, which is different from the prior art methods and systems used for generating hydrogen using electrolysis. Electrolysis has been shown to be effective in removing films from the fuel material so that the hydrogen-producing reaction can be sustained for longer periods of time as a result of having a continuously-cleaned surface of the fuel material.

There can be several advantages for using a hybrid system. A single chamber can provide for electro-activation of the carbon, as well as provide for hydrogen generation. Accordingly, the carbon can continuously be converted to electro-activated carbon and then produce hydrogen. Another advantage can be that more hydrogen can be produced per unit energy input than if electrolysis alone were used, and the power input required for electrolysis can be used to heat the catalytic reactions described in Equations 1 and 2 to a desired operating temperature. Further, the electrolysis chemistry can aid in oxidizing the aluminum in the catalytic reactions described in Equations 1 and 2 to tie up OH chemical groups when the water is split into H and OH groups.

In some exemplary embodiments, a hybrid system can use electrolysis and catalytic carbon in combination to produce hydrogen. Often, when using electro-activated carbon with a fuel, such as aluminum, aluminum oxide and aluminum hydroxide can be formed in the form of large solids. These solids can be large, and can be difficult to remove during operation of the cell as well as during maintenance of the cell. If a low current electrolysis is used in the liquid composition containing the electro-activated carbon and aluminum, then formation of these large solids can be prevented, such that only very small grains of aluminum oxide and aluminum hydroxide are formed. Another advantage of providing electrolysis to the cell can be that the energy deposited in the liquid can be a source of heat. Heat can be used for the catalytic carbon reaction to produce hydrogen at a higher rate, such that the hydrogen production rate can double with every increase in temperature of approximately 18 to approximately 20 degrees Fahrenheit. Various other combinations of hybrid systems are contemplated by the present disclosure and are not limited to the above.

Electrolysis can also be used in hydrogen producing cells to prevent any buildup of aluminum hydroxide, both on the aluminum surface and as solid "clumps" in the cell. Low-level electrolysis has been found to prevent the buildup of aluminum hydroxide in hydrogen producing cells containing a catalyst, water and aluminum. For example, a DC current of approximately 100 milliamperes or less can be effective in preventing the aluminum hydroxide from forming lumps or clumps in electrolysis cells that range in construction from two plates to seven plates, and range in size (volume) from 5 square centimeters to 1000 square centimeters. Further, a DC current of approximately 100 milliamperes or less can be effective in preventing the aluminum hydroxide from coating the aluminum and slowing the production of hydrogen. This can prevent the need for mechanical burnishing to maintain a clean aluminum surface during the hydrogen-producing chemical reaction as described in the exemplary embodiments of the present disclosure. Further, electrolysis can be used in hydrogen producing cells to clean the surface of any material and prevent buildup of any material in the cell, not just aluminum, as electrolysis can dissociate any molecule, not just water and aluminum hydroxide.

Further, the catalyst (such as catalytic carbon or catalytic lead) can increase the hydrogen production performance of a broad range of types of electrolysis cells. It was found that adding the catalyst to electrolysis cells can increase the hydrogen-production efficiency, per watt, of the electrolysis cell. For example, when electro-activated carbon is added to an electrolysis cell, two mechanisms of action are active during the production of hydrogen from the cell. First, the electrical production of hydrogen from electrolysis, and second, the chemical production of hydrogen from the use of the electro-activated carbon. The advantages of this can be that the chemical production of hydrogen benefits from the co-existant electrical production of hydrogen. Further, the electrical production of hydrogen benefits from the co-existant chemical production of hydrogen.

The reasons for the increase of the hydrogen-production efficiency of the electrolysis cell can be that the electro-activated carbon lowers the activation energy, $E_a$, of the water splitting process, thereby resulting in more hydrogen production per watt of power applied to the electrolysis cell. The electro-activated carbon hydrogen-producing reaction is exothermic. The reaction provides heat which makes it easier to compensate from heat lost due to cooling, leading to a system designed to operate under thermal-equilibrium conditions, if desired. If an electro-activated carbon HOD system is operated under thermal-equilibrium conditions, no heat is needed to sustain the production of hydrogen once the system is started and warmed up to the desired operating temperature. Further, the chemical production (using electro-activated carbon) of hydrogen increases as the cell temperature increases. The chemical production requires no "electrolysis energy." The chemical production of hydrogen benefits from the heat (temperature increase) resulting from the electrolysis power dissipation.

The catalyst can further increase the performance of all electrolysis cells. The catalyst was found to increase the performance of DC electrolysis cells, and the performance of self-resonant electrolysis cells, particularly when the electrolysis cells contain aluminum (e.g., aluminum granules). Cell design and operational parameters can determine how much electro-activated carbon or other catalyst can increase the hydrogen-production performance and can determine the efficiency of electrolysis cells. The cell operation parameters which can be important can be operating temperature and cell chemistry. Operating temperature and cell chemistry can determine how much electro-activated carbon or how much of a particular catalyst can increase the hydrogen-production performance and efficiency of electrolysis cells.

In the exemplary embodiments of the present disclosure, hydrogen production rates can be much higher than that of electrolysis or thermo-reforming processes. These exemplary embodiments can use external heat to start the chemical reaction described above, which can generally be in the temperature range of approximately 150 degrees Fahrenheit to approximately 190 degrees Fahrenheit, but are not limited to this temperature range. Generally, the reaction temperature can be as low as standard room temperature, and even lower, although the hydrogen generation rate can decrease by approximately 50% for every approximately 18-20 degrees Fahrenheit reduction in operating temperature. The reaction temperature can be as high as the boiling temperature of water, and even higher in a steam environment where higher hydrogen output flow rates are required. The exemplary embodiments of the present disclosure are not limited to a particular temperature range, or to a particular pressure range. Higher temperatures can be provide for an apparatus that can accommodate steam and pressure.

Once started, as the catalytic reactions described in the present disclosure are fundamentally exothermic, the reactions can provide enough heat to sustain the reactions if the hydrogen cell thermodynamic equilibrium is designed to occur at the desired operating temperature. Thermodynamic-equilibrium operating conditions can be achieved when the amount of energy (heat) leaving the system is the same as the amount of energy (heat) entering the system (primarily because of the heat being generated by the exothermic reaction). Under these experimental conditions, the system temperature can remain constant, and externally-supplied energy may not be required for heating or cooling. Under different (non-thermal equilibrium) operating conditions, the only external energy required may be for cooling, if needed to limit the hydrogen production rate to, e.g., a desired target value, and/or limit the temperature of the cell to prevent boiling or excessive loss of water vapor.

In exemplary embodiments of the present disclosure, several experimental runs were carried out in which hydrogen peak production rates were obtained. It was found that there was no real upper limit of hydrogen generation rates, and when the catalyst amounts, water (or other hydrogen containing material) and fuel, such as aluminum are increased, substantially high rates of hydrogen production are possible. Experiments conducted showed hydrogen production rates up to 30 gallons per minute. These high production rates of hydrogen resulted from the use of a cell (similar to the one described in FIG. 5) having a cell volume of approximately 5 gallons. Accordingly, higher rates can be provided according to the exemplary embodiments of the present disclosure by, e.g., using larger cells, in which more catalyst, aluminum and water can be provided. It was demonstrated that controlled, sustained production of hydrogen can be achieved by providing water, aluminum and catalyst to a hydrogen-production cell.

In some exemplary embodiments of the present disclosure, the use of electromagnetic separation can be provided. When water is first split, the result is $H_2O+CC=>CC+H+OH$. The H and the OH molecules can recombine, returning to water, which may not be desirable because the H molecule is then not available for collection and use. At the moment of the water splitting event, the H can be a positive ion and the OH can be a negative ion. It can be desirable to separate the two ions before they recombine. The separation can be done using electricity, such as electric force, magnetic force, and electromagnetic force. The use of electromagnetic force can be done by applying both an electric and a magnetic field to the water in the region where the water splitting event occurs. When H+ and OH– ions are created, the electric field can cause both ions to move as a result of the applied electric field. When the ions move through the magnetic field, they will be deflected when a component of the velocity vector is perpendicular to the direction of the magnetic field. Both the electric and magnetic fields act to separate the H+ ions from the OH– ions, thereby leading to a lower probability that the ions will be recombine and be removed from the hydrogen harvesting process.

The development of an electromagnetic field can be achieved by using electrodes (anodes and cathodes) that are configured in the form of a coil or multiple coils, thereby leading to the development of an electromagnet in the region where water splitting events occur. The current through the electrodes can be direct current (DC), alternating current (AC), rectified AC (pulsed waveform having a DC component), or any other time-varying waveform including pulse trains at different frequency values including frequencies that can have resonance effects in the region where water splitting events take place.

The exemplary embodiments of the methods and systems described herein can facilitate and/or provide, e.g., fuel for vehicles (trucks, cars, motorcycles, etc.), fuel for marine vessels (boats, submarines, cargo ships, etc.), power for generator-motor systems (GENSETs), power plants which can provide electricity for buildings, cities, etc., and several other applications where hydrogen can be used as a source of fuel/power. For applications requiring heater water or steam, a boiler apparatus can be possible due to the catalytic carbon reactions described herein that can produce hydrogen under water. There are many fields of use and embodiments contemplated by the present disclosure in which hydrogen production, ranging from low to very high flow rates, requiring no tank storage, can be used for various purposes, and the present disclosure is not limited to any particular use or purpose.

Various other considerations can also be addressed in the exemplary applications described according to the exemplary embodiments of the present disclosure. Various rates of hydrogen generation, along with different volumes of hydrogen generation, can be provided depending on the field of application. Different factors such as the amount of water, amount of fuel, such as aluminum, and amount of catalyst can be a factor. One skilled in the art can understand that routine experimentation based on the exemplary embodiments of the present disclosure can provide various rates and volumes of hydrogen generation. Controlling the temperature during these reactions can provide hydrogen on demand, and hydrogen cells can be constructed that can regulate the temperature of the chamber of the hydrogen cell during the reaction to provide hydrogen on demand to, e.g., a vehicle.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, manufacture and methods which, although not explicitly shown or described herein, embody the principles of the disclosure and are thus within the spirit and scope of the disclosure.

What is claimed is:

1. A method of producing a catalyst for hydrogen production, comprising:
   providing a material having an absolute magnitude of a difference in electronegativities between the material and hydrogen of between approximately 0.08 to approximately 0.36, wherein the material excludes carbon; and
   providing electrical energy through the material to induce polarization of the material to electro-activate the material;
   using the electro-activated material to produce hydrogen.

2. The method of claim 1, wherein the material is provided in a liquid composition comprising water.

3. The method of claim 1, further comprising:
   determining whether the material has a catalyst hydride dissociation energy between approximately 0 to approximately 100 kcal/mol.

4. The method of claim 1, further comprising:
   determining whether the material has a difference in electronegativities between atoms in a polar oxide molecule on a surface of the material between approximately 0.3 to approximately 1.4.

5. The method of claim 1, wherein the material is lead.

6. A method of producing hydrogen, comprising:
   determining whether a material has an absolute magnitude of a difference in electronegativities between the material and hydrogen of between approximately 0.08 to approximately 0.36, wherein the material excludes carbon;
   electro-activating the material by providing electrical energy through the material to induce polarization of the material to electro-activate the material if the material has the absolute magnitude of a difference in electronegativities between the material and hydrogen of between approximately 0.08 to approximately 0.36;
   combining the electro-activated material with a hydrogen containing molecule; and
   generating a chemical reaction between the combination of electro-activated material and the hydrogen containing molecule to release a hydrogen atom from the hydrogen containing molecule.

7. The method of claim 6, further comprising:
   determining whether the material has a catalyst hydride dissociation energy between approximately 0 to approximately 100 kcal/mol before electro-activating the material.

8. The method of claim 6, further comprising:
   determining whether the material has a difference in electronegativities between atoms in a polar oxide molecule on a surface of the material between approximately 0.3 to approximately 1.4 before electro-activating the material.

9. The method of claim 6, further comprising:
   combining the electro-activated material and hydrogen containing molecule with a fuel; and
   generating a chemical reaction between the combination of the electro-activated material, hydrogen containing molecule and fuel to produce hydrogen.

10. The method of claim 9, wherein the fuel is one of pure aluminum, aluminum powder, aluminum granules or aluminum shavings.

11. The method of claim 9, further comprising:
    controlling the chemical reaction of the combination of electro-activated material, hydrogen containing molecule and fuel to produce hydrogen on demand by heating the combination to increase the production of hydrogen, and by cooling the combination to decrease the production of hydrogen.

12. The method of claim 11, wherein the combination is heated to a temperature range between approximately 150 degrees Fahrenheit to approximately 190 degrees Fahrenheit.

13. The method of claim 6, wherein the hydrogen containing molecule comprises water, tap water, dirty water, high-calcium water, salt water, sea water, alkaline water or acidic water.

14. The method of claim 6, wherein the material is catalyzed aluminum or lead.

15. A system for producing hydrogen, comprising:
    a vessel having a hydrogen containing molecule and an electro-activated material known to have an absolute magnitude of a difference in electronegativities between the material and hydrogen of between approximately 0.08 to approximately 0.36, wherein the electro-activated material excludes carbon and is electro-activated by providing electrical energy through the material to induce polarization of the material; and
    an apparatus for generating a chemical reaction between the hydrogen containing molecule and electro-activated material to produce hydrogen.

16. The system of claim 15, further comprising:
    a fuel provided in the vessel with the hydrogen containing molecule and electro-activated material; wherein the apparatus generates a chemical reaction between the hydrogen containing molecule, electro-activated material and fuel to produce hydrogen.

17. The system of claim 16, wherein the fuel is one of pure aluminum, aluminum powder, aluminum granules or aluminum shavings.

18. The system of claim 16, further comprising:
    one or more mechanisms to control the chemical reaction between the hydrogen containing molecule, electro-activated material and fuel to produce hydrogen on demand, wherein the one or more mechanisms heat the combination of the hydrogen containing molecule, electro-activated material and fuel to increase the production of hydrogen, and cool the combination of the hydrogen containing molecule, electro-activated material and fuel to decrease the production of hydrogen.

19. The system of claim 15, wherein the hydrogen containing molecule comprises water, tap water, dirty water, high-calcium water, salt water, sea water, alkaline water or acidic water.

20. The system of claim 15, wherein the material has a catalyst hydride dissociation energy between approximately 0 to approximately 100 kcal/mol.

21. The system of claim 15, wherein the material has a difference in electronegativities between atoms in a polar oxide molecule on a surface of the material between approximately 0.3 to approximately 1.4.

22. The system of claim 15, wherein electrolysis is further provided in the vessel.

23. The system of claim 15, wherein the material is catalyzed aluminum or lead.

* * * * *